(12) United States Patent
Dubief et al.

(10) Patent No.: US 10,966,563 B2
(45) Date of Patent: Apr. 6, 2021

(54) BEVERAGE PREPARATION APPARATUS COMPRISING A MIXING CHAMBER

(71) Applicant: NESTEC S.A., Vevey (CH)

(72) Inventors: Flavien Dubief, Champagne (CH); Olivier Paillard, Metabief (FR)

(73) Assignee: Societe des Produits Nestle S.A., Vevey (CH)

( * ) Notice: Subject to any disclaimer, the term of this patent is extended or adjusted under 35 U.S.C. 154(b) by 155 days.

(21) Appl. No.: 16/461,240

(22) PCT Filed: Nov. 10, 2017

(86) PCT No.: PCT/EP2017/078830
§ 371 (c)(1),
(2) Date: May 15, 2019

(87) PCT Pub. No.: WO2018/091358
PCT Pub. Date: May 24, 2018

(65) Prior Publication Data
US 2019/0274468 A1    Sep. 12, 2019

(30) Foreign Application Priority Data

Nov. 16, 2016 (EP) .................................. 16199067

(51) Int. Cl.
*A47J 31/40* (2006.01)

(52) U.S. Cl.
CPC ........... *A47J 31/401* (2013.01); *A47J 31/404* (2013.01)

(58) Field of Classification Search
CPC .............................. A47J 31/401; A47J 31/404
See application file for complete search history.

(56) References Cited

U.S. PATENT DOCUMENTS

| | | | | |
|---|---|---|---|---|
| 3,988,974 A | * | 11/1976 | Kaplan | A47J 31/007 99/285 |
| 5,575,405 A | * | 11/1996 | Stratton | B67D 1/0021 222/1 |
| 2003/0150879 A1 | * | 8/2003 | Ufheil | A47J 31/401 222/190 |
| 2005/0079265 A1 | * | 4/2005 | Ufheil | A47J 31/401 426/569 |
| 2009/0107342 A1 | | 4/2009 | Piscaer et al. | |
| 2014/0123859 A1 | * | 5/2014 | Verbeek | A47J 31/407 99/295 |
| 2015/0128812 A1 | | 5/2015 | Gugerli et al. | |

* cited by examiner

*Primary Examiner* — Anthony J Weier
(74) *Attorney, Agent, or Firm* — K&L Gates LLP

(57) ABSTRACT

The invention concerns a beverage preparation apparatus (10), said apparatus having at least one chamber (1) for receiving and mixing an aqueous liquid and at least one soluble beverage ingredient, said chamber having: a cylindrical lateral side wall (11) having a liquid inlet (2), a bottom wall (12) having a beverage outlet (3), and wherein the liquid inlet (2) is positioned close to the bottom of the chamber, and wherein the liquid inlet (2) is configured so that the liquid is introduced in the chamber as a straight jet of liquid, and wherein said chamber includes a first bump (4) separating the bottom wall in two areas (121, 122), and wherein said chamber includes a second bump (5) rising from the bottom and lateral side walls of the chamber and presenting a shape designed to convert the jet of liquid into a swirl and to guide said swirl so that it flows along the line L in front of the liquid inlet.

17 Claims, 13 Drawing Sheets

BEVERAGE PREPARATION APPARATUS COMPRISING A MIXING CHAMBER

CROSS REFERENCE TO RELATED APPLICATIONS

The present application is a National Stage of International Application No. PCT/EP2017/078830, filed on Nov. 10, 2017, which claims priority to European Patent Application No. 16199067.6, filed on Nov. 16, 2016, the entire contents of which are being incorporated herein by reference.

FIELD OF THE INVENTION

The present invention relates to beverage dispensers preparing beverages from a soluble beverage powder and in which a dose of said powder is mixed with a liquid mixing chamber.

BACKGROUND OF THE INVENTION

WO 2008/071613 describes a mixing chamber for preparing frothed beverages wherein a dose of a beverage soluble ingredient is mixed with a liquid. Such a mixing chamber is particularly adapted for preparing a frothed coffee beverage from soluble instant coffee. The mixing chamber provides sufficient agitation with the water to dissolve and froth the coffee.

With the above mixing chamber, it has been observed that, once dispensed in a cup, frothed coffee does not always present an optimal aspect. Specifically, depending on design of the chamber, the crema at the top of the beverage can present the following defects: presence of big bubbles at the surface, inhomogeneous colour due to non dissolved coffee powder, few or instable crema at the surface.

It has been observed that these defects usually does not happen when a sieved baffle is positioned through the chamber. Yet such a baffle provides complexity in terms of production and cleaning.

Besides, this chamber creates strong mixing of liquid due to the use of a jet for introducing water in the chamber. This mixing provides a lot of mist and humidity, a part of which rises up to the top of the chamber and squirts out of the chamber. Humidity can settle on the internal walls of the apparatus positioned above the chamber, in particular it can reach the device dosing the soluble beverage ingredient above the chamber. The effect is drastic because humidity reacts with residues of soluble ingredient and block this device if it is not regularly cleaned. Humidity can carry beverage ingredient too out of the chamber and dirty the internal walls.

For these reasons, it has been proposed to move the mixing chamber away from the powder dosing device during the step of mixing as described in WO 2009/153157. The solution is efficient. Yet, as a consequence, the beverage preparation apparatus is larger in order to provide place for the chamber movement and its implementation is complex.

There is a need for improving this type of mixing chamber so that it enables the preparation of frothed coffee from instant coffee powder or concentrate with optimal aspect.

There is a need for improving this type of mixing chamber so that it is not necessary to move said chamber away from the dosing device during the mixing step and the beverage machine is kept simpler.

It would be advantageous to provide a mixing chamber that remains easy to assemble and to clean.

SUMMARY OF THE INVENTION

In a first aspect of the invention, there is provided a beverage preparation apparatus, said apparatus comprising at least one chamber for receiving and mixing an aqueous liquid and at least one soluble beverage ingredient, said chamber comprising:
  a cylindrical lateral side wall comprising a liquid inlet,
  a bottom wall comprising a beverage outlet, and
wherein the liquid inlet is positioned close to the bottom of the chamber, and
wherein the liquid inlet is configured so that the liquid is introduced in the chamber as a straight jet of liquid, said introduced straight jet extending horizontally and transversely through the internal volume of the chamber along a line L, said line L being offset relative to the longitudinal central axis of the chamber,
wherein said chamber comprises a first internal bump rising from the bottom wall of the chamber, said first bump separating:
  a first area of the bottom part of the chamber wherein the introduced straight jet extends horizontally and transversely through the internal volume of the chamber along a line L
  from a second area of the bottom part of the chamber comprising the beverage outlet, and
wherein said chamber comprises a second bump rising from the bottom and extending from the lateral side wall of the chamber and presenting a shape designed:
  to convert the introduced straight jet of liquid extending horizontally and transversely through the internal volume of the chamber into a swirl upwardly rising along the lateral side wall of the chamber, and
  to guide said swirl so that it flows along the line L in front of the liquid inlet.

The chamber of the apparatus comprises a substantially cylindrical lateral side wall. Preferably this wall is such that its longitudinal distance (or height) is longer than its diameter (or width). Preferably, the chamber is positioned in the apparatus so that the lateral side wall is substantially vertical.

Usually the top of the chamber is at least partially opened. Soluble beverage ingredient can be introduced in the chamber through the opened top by gravity fall.

The bottom wall comprises the beverage outlet. The beverage outlet is usually a hole or a plurality of holes through the bottom wall.

The cylindrical lateral side wall comprises the liquid inlet. This liquid inlet is positioned close to the bottom of the chamber. Accordingly the chamber is filled with liquid from the bottom.

The liquid inlet is configured so that the liquid is introduced in the chamber under the form a straight jet of liquid. By jet it is understood a stream of liquid that comes out of the liquid inlet and in the chamber quickly and with force. So the liquid inlet is configured for introducing liquid in the inner chamber with a high velocity. Usually, this straight jet is produced by and emerges from a nozzle positioned in the liquid inlet of the lateral wall of the chamber.

Accordingly, the liquid inlet preferably comprises a nozzle.

According to a less preferred embodiment, the nozzle can be designed inside the cylindrical lateral side wall. Consequently, the chamber and the nozzle can be made of one single piece of material.

The size of the liquid nozzle outlet, the diameter of the chamber and the pressure of the liquid are generally adapted accordingly to get the high velocity of the jet and the swirling effect for liquid.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm.

With such a dimension, the delivery of water at a pressure comprised between 2 and 10 bar, preferably of at least 6 bar, in the nozzle enables the production of a jet of high velocity and the production of the swirl in a chamber presenting a largest transversal dimension comprised between 40 and 50 mm.

When a nozzle is present in the liquid inlet, the outlet end of the nozzle can jut out over the internal surface of the lateral side wall. Usually, the outlet end of the nozzle can jut out by at most 5 mm over the internal surface.

The liquid inlet is also oriented so that the straight jet of liquid extends horizontally and transversely through the internal volume of the chamber along a line L, said line L being offset relative to the longitudinal central axis of the chamber.

More specifically, the line L is oriented in a direction so that a ratio "d/r" is comprised between 0.2 and 0.4, preferably is of about 0.3, where "r" is the radius of the chamber and "d" is the distance measured orthogonally from the line L to the central longitudinal axis of the chamber.

The chamber comprises a first internal bump rising from the surface of the bottom wall of the chamber. This bump extends from the surface of the bottom wall inside the internal volume of the chamber. This first bump is designed in order to separate two areas of the bottom part of the chamber, that is:

the first area wherein the introduced straight jet of liquid extends along the line L, and the second area comprising the beverage outlet.

Accordingly, this first bump prevents liquid emerging from the liquid inlet from immediately reaching the beverage outlet. The first bump helps keeping the introduced jet of liquid away from the beverage outlet. Accordingly the risk that non-well prepared beverage (for example, poorly dissolved powder or water only) is dispensed through the outlet is minimised.

The first internal bump extends partially through the transversal section of the chamber and, at its ends, provides paths for the swirl of liquid.

Generally, the side of the first internal bump facing the first area is a straight surface. This straight surface extends in parallel to the line L along which the straight jet of liquid extends. According to the preferred embodiment, the other side of the first internal bump facing the second area is a straight surface too parallel to the line L. According to this embodiment, the first bump is a straight wall rising form the bottom and parallel to the line L.

According to another embodiment, the other side of the first internal bump facing the second area partially surrounds the beverage outlet. According to this embodiment, the first bump can present a half-moon shape rising from the bottom and can comprise a notch around the beverage outlet. This shape builds an efficient barrier around the beverage outlet, preventing liquid from immediately reaching said outlet.

The chamber comprises a second internal bump rising from the surface of the bottom wall and extending from the surface of the lateral side walls of the chamber. This bump extends inside the internal volume of the chamber. This second bump is designed in order to convert the introduced straight jet of liquid into a swirl of liquid upwardly rising along the lateral side wall of the chamber. This effect happens at least as long as liquid is introduced through the liquid inlet.

This swirl effect associated to the presence of the first bump prevents even more liquid emerging from the liquid inlet from immediately reaching the beverage outlet.

Generally, at the point of the chamber opposed to the liquid inlet along the line L, the second bump designs a curve configured to convert the straight jet of liquid into a swirl along the lateral side wall of the chamber. This curved shape guides the flow so that the direction of the jet changes gently while limiting splashing.

This second bump is also designed in order to guide the swirl of liquid so that said swirl flows along the line L in front of the liquid inlet. Accordingly, the swirl of liquid becomes sheared by the jet of liquid that is being entering the chamber through the liquid inlet, which enables an efficient mixing of liquid, beverage ingredient and air.

Generally, at the liquid inlet, the second bump designs a curve configured to guide the swirling liquid in direction of and along the line L in front of the liquid inlet.

Preferably, the first internal bump and the second internal bump partially design a straight conduit around the straight jet of liquid.

Accordingly the first and second bumps present shapes and are oriented one to the other in order to create a straight conduit. Each of the first and second bumps can present a straight surface parallel to the line L. This straight conduit avoids that the jet of entering liquid becomes chaotic and disorganised and creates mist that would splash all around the chamber and in particular above. The jet is canalized by the straight conduit.

Generally such a straight conduit can present a width comprised between 3 and 10 mm, preferably between 5 and 6 mm.

Preferably the first bump is designed to decrease the speed of the swirl of liquid when the swirl reaches the area of the liquid inlet.

The first bump can be designed and positioned to control the speed of the swirl of liquid that has been created from the straight jet by the second bump and, specifically, to get a difference between the speed of the swirl when it flows in the area of the liquid inlet and the speed of the jet of liquid entering the chamber.

Accordingly, in this area of the liquid inlet, the important difference between the speed of the liquid entering the chamber as a jet and the speed of the liquid swirling inside the chamber and flowing again along the line L generates an important shearing of the curtain of swirling liquid by the jet and, consequently, mixing and frothing of the beverage in preparation. Generally the shape of the first bump enables the control the speed of the swirl by defining the section area through which the swirl can flow. Preferably, the first bump is designed so as to define a cross section area above the second area for the swirl of liquid larger than the cross section area above the first area for the jet of liquid. Consequently, by providing a large section area for the swirl of liquid generated from the jet of water, the speed of liquid in the swirl becomes inferior to the speed of the liquid in the straight jet and, consequently, the difference of speeds is reached.

In the preferred embodiment, the first internal bump is a straight wall parallel to the line L. Preferably the width of this straight wall is configured in order to define a large volume above the first area. Accordingly the swirl is able to flow through a large cross section area and its speed decreases above this first area of the bottom.

According to the less preferred embodiment, the first internal bump is designed so as to define a circular conduit for the swirl, said circular conduit extending along the lateral cylindrical wall of the chamber and said conduit presenting a cross section area increasing in direction of the liquid inlet. This embodiment can be implemented with the first bump presenting a half-moon shape rising from the bottom and comprising a notch around the beverage outlet. Accordingly, as long as the liquid is swirling, it follows the circular conduit and no liquid reaches the beverage outlet and, when the swirl stops, the notch enables the beverage to flow to the beverage outlet.

Generally, the first and the second bumps extend partially only along the height of the chamber. Consequently, the section of the chamber above the bumps is increased and enables the preparation of a higher volume of beverage. Above the bumps, the section of the chamber is circular and accordingly the swirl of liquid is maintained along the lateral side wall.

Preferably, the first and the second bumps extend upwardly along the same height. The height of the first and the second bumps can be comprised between 5 and 20 mm, preferably is of about 15 mm. This height is sufficient to force the liquid entering the chamber to follow the desired circulation inside the chamber. Once the movement of liquid is correctly initiated, the presence of bumps above the liquid inlet is not mandatory.

Preferably the surfaces of the top of the first and second bumps are inclined in respect of horizontal. Accordingly no liquid is retained at the surface of the bumps at the end of the beverage preparation.

The beverage outlet can be slightly offset from the centre of the bottom of the chamber. This effect can be due to the presence of the first bump close to the centre of the chamber.

Preferably the surface of the bottom of the chamber is inclined in respect of horizontal and the beverage outlet is positioned at the lowest position.

According to one embodiment, the chamber comprises a top cover at the upper end of the cylindrical lateral side wall of the chamber and said top cover comprises a hole defining an inlet for soluble beverage ingredient.

Accordingly the cover prevents the swirl of liquid from overflowing the upper edge of the lateral side wall. Yet, the hole in the cover provides a path for a dose of soluble beverage ingredient falling from above. Usually, this hole is positioned close to the centre of the chamber.

Preferably, the cover comprises a lip extending downwardly from the edge of the hole of the soluble beverage ingredient inlet.

The lip provides an additional means preventing the swirl of water from overflowing and water projections from splashing and reaching the powder dosing device above, According to another preferred embodiment, the chamber comprises a funnel attached at the upper end of the cylindrical lateral side wall of the chamber, said funnel extending from the top of the chamber down to the inside of the chamber and said funnel comprising discrete holes.

Accordingly, the funnel prevents the swirl of liquid from overflowing the upper edge of the lateral side wall and simultaneously provides a chute for the beverage ingredient falling from above the chamber. Usually the funnel is centred on the centre of the chamber.

The discrete holes in the funnel enable liquid swirling in the space between the chamber lateral side wall and the funnel to overflow therethrough. Consequently, the upper surface of the funnel can be rinsed by the swirling liquid and can be cleaned if beverage ingredient has been retained thereon.

Preferably no hole is present in the part of the funnel placed vertically above the line L and at the opposite of the liquid inlet.

Generally, the beverage preparation apparatus comprises a liquid supply system connectable to the liquid inlet.

The liquid can be any suitable liquid adapted for dissolving a beverage soluble ingredient using the features and conditions of the device. A preferred liquid is water either hot or cold. Generally the liquid supply system of the beverage production machine comprises at least a liquid tank or liquid supply, a liquid pump, a liquid heater and/or cooler and a valve for actuating the liquid delivery. The system can also comprise a selection valve for delivering liquid at either hot or cold temperature.

Generally the beverage production apparatus comprises a receiving area in order to removably position the chamber inside the apparatus and to connect the chamber liquid inlet to the liquid supply system.

Accordingly the chamber can be removed for cleaning and maintenance.

Preferably, the beverage preparation apparatus comprises a dosing device configured for dispensing a dose of soluble beverage ingredient in the chamber.

Generally the dosing device is placed above the chamber in order to feed it by gravity fall. The dosing device can be associated to a powder reservoir or a liquid concentrate reservoir. In a variant, the apparatus can be devoid of dosing device and beverage ingredient reservoir. Then, beverage ingredient can be introduced in the chamber manually.

According to a second aspect, the invention concerns a method for producing a beverage in a beverage preparation apparatus such as described above, said method comprising the steps of:
dosing the chamber with soluble beverage ingredient, and introducing a liquid through the liquid inlet.

The dosing of the ingredient is usually automatic and controlled by a controller of the apparatus. Yet, in a particular mode, the dosing of the ingredient can be manually made by manual actuation of a dosing device or with a spoon and beverage ingredient jar or with a stick pack.

Preferably, the chamber is dosed with soluble beverage ingredient before a liquid is introduced in the chamber.

The soluble beverage ingredient can be selected in the list of soluble coffee (instant coffee) powder, chocolate powder, milk powder and mixtures thereof. Mixtures of sugar, instant coffee and milk powder known as coffee mixes can also be used. Other soluble powder ingredients like soluble tea, dehydrated culinary ingredients and/or milk based ingredients can be used. The device and the method of the present invention are applicable too to the dissolution of liquid concentrates with a liquid. Such liquid concentrates may be coffee, chocolate, tea or milk concentrates or syrups.

In the present application the terms "internal", "external", "top", "upper", "lower", "bottom" and "lateral" are used to describe the relational positioning of features of the invention. These terms should be understood to refer to the chamber in its normal orientation when positioned in a beverage preparation dispenser for the production of a beverage as shown in the figures The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
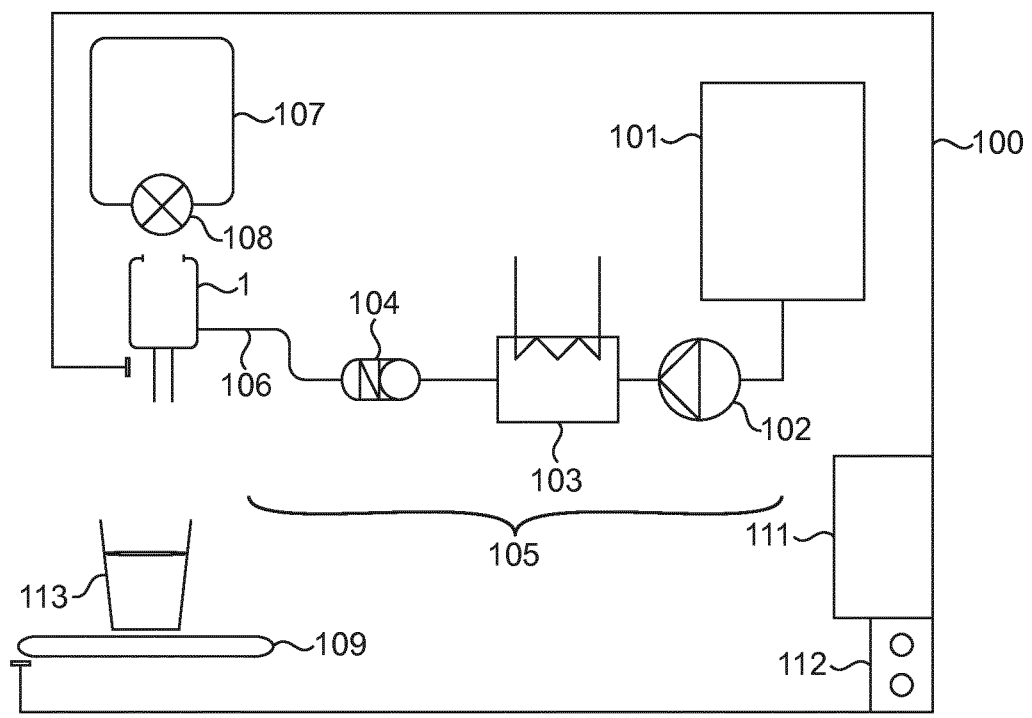
FIG. 1 is a schematic view of a beverage preparation apparatus.

FIG. 1 illustrates a beverage production apparatus 100. The apparatus includes a mixing chamber 1 for producing a beverage from a soluble beverage ingredient and an aqueous liquid, preferably water, entering the chamber.

The beverage ingredient is stored in a reservoir 107. The reservoir can be a hopper which is permanent or a disposable package containing the soluble ingredient.

A dose of beverage ingredient is metered and dispensed by a dosing device 108. The dosing device has the primary function to meter upon request doses of ingredient into the mixing chamber 2. The dosing device dispenses the dose of beverage ingredient in mixing chamber 1, generally by gravity fall in a top opening of the chamber.

The dosing device can be any suitable system such as a dosing screw, a reciprocating dosing piston or a rotating disc. The dosing technology is also of course dependent on the nature of the soluble ingredient. The soluble ingredient is typically a dry beverage powder, preferably instant soluble coffee. However, it could also be a liquid concentrate such as coffee concentrate. The device is fed upon request with ingredient manually or automatically as prompted by a controller 111 and command 112.

When the beverage ingredient is a powder, this dosing device can be a rotating device such as described in WO 2009/144239.

According to a particular embodiment (not illustrated), the beverage production apparatus can be deprived of reservoir and dosing device. Accordingly, the user can introduce a dose of ingredient in the chamber manually using a spoon or a stick of powder.

A liquid, preferably water, supplying system 105 is provided in the machine to be able to feed water in the mixing chamber 1, more particularly, hot water.

The water supplying system comprises:
- a tank 101 that can be replenished with fresh water, or eventually connected to tap water,
- a water pump 102 for pumping water from the tank 101. The pump can be any type of pump such as a piston pump, diaphragm pump or a peristaltic pump.
- a water heater 103 such as a thermoblock or a cartridge type heater to heat the pumped water, alternatively or in addition to, the machine can comprise a water cooler in a line bypassing the heater,
- a non-return valve 104.

Finally water is fed into the mixing chamber by a tube 106.

As illustrated in FIG. 1, the mixing chamber 1 can be placed directly above a service tray 109 onto which is placed a drinking cup 113 to receive the beverage liquid. Generally, the mixing chamber 1 is removable from the machine for cleaning and optionally for dosing. Usually the machine comprises a mixing chamber receiving area to removably fix the chamber inside and provide cooperation between the mixing chamber liquid inlet and the liquid supply tube 106.

Usually, the chamber 2 is immobile within the apparatus. Yet, in a less preferred embodiment, the mixing chamber 1 can be movable to a position placed under the dosing device 108 as described in WO 2009/153157.

The controller 12 can coordinate dosing of the soluble beverage ingredient by the dosing device 108 and liquid by the pump 102 upon the user actuating or being prompted to press the command 112 on the apparatus.

Figure 2A:
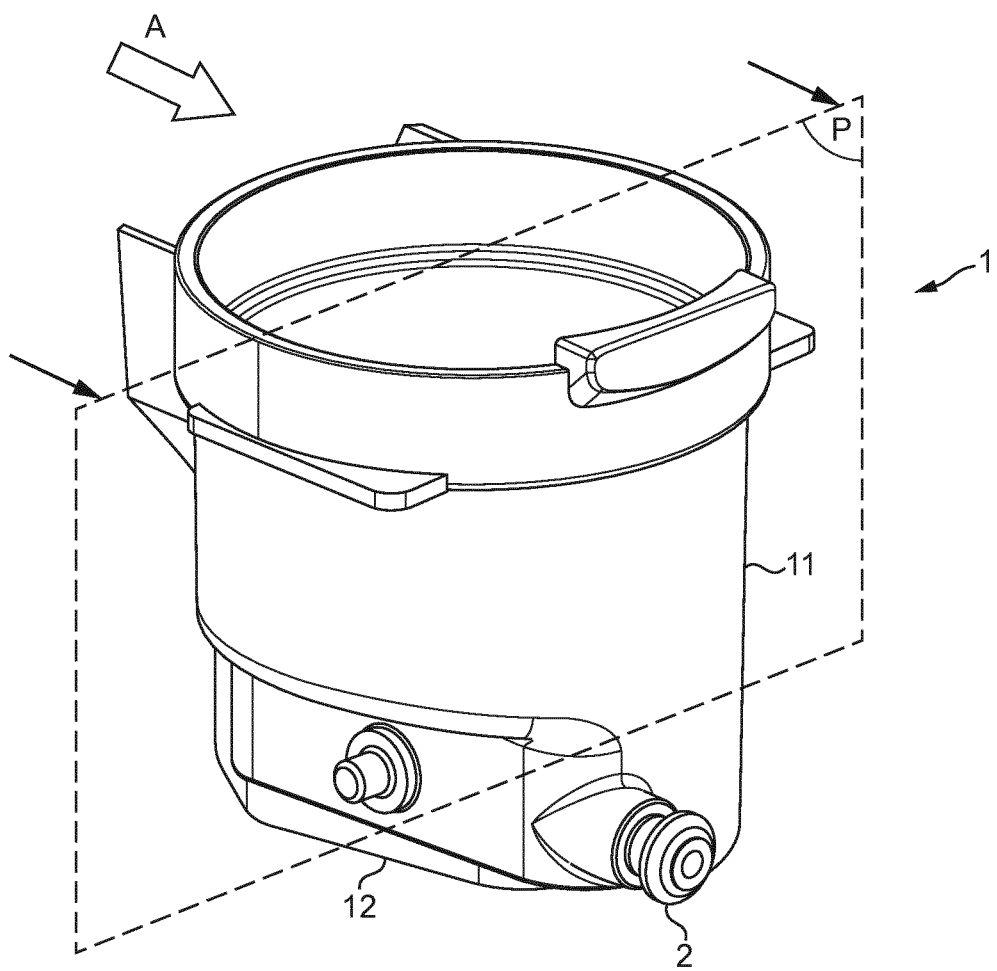
FIGS. 2a and 2b are perspective view of a chamber used in a beverage preparation apparatus according to the invention.
Figure 2B:
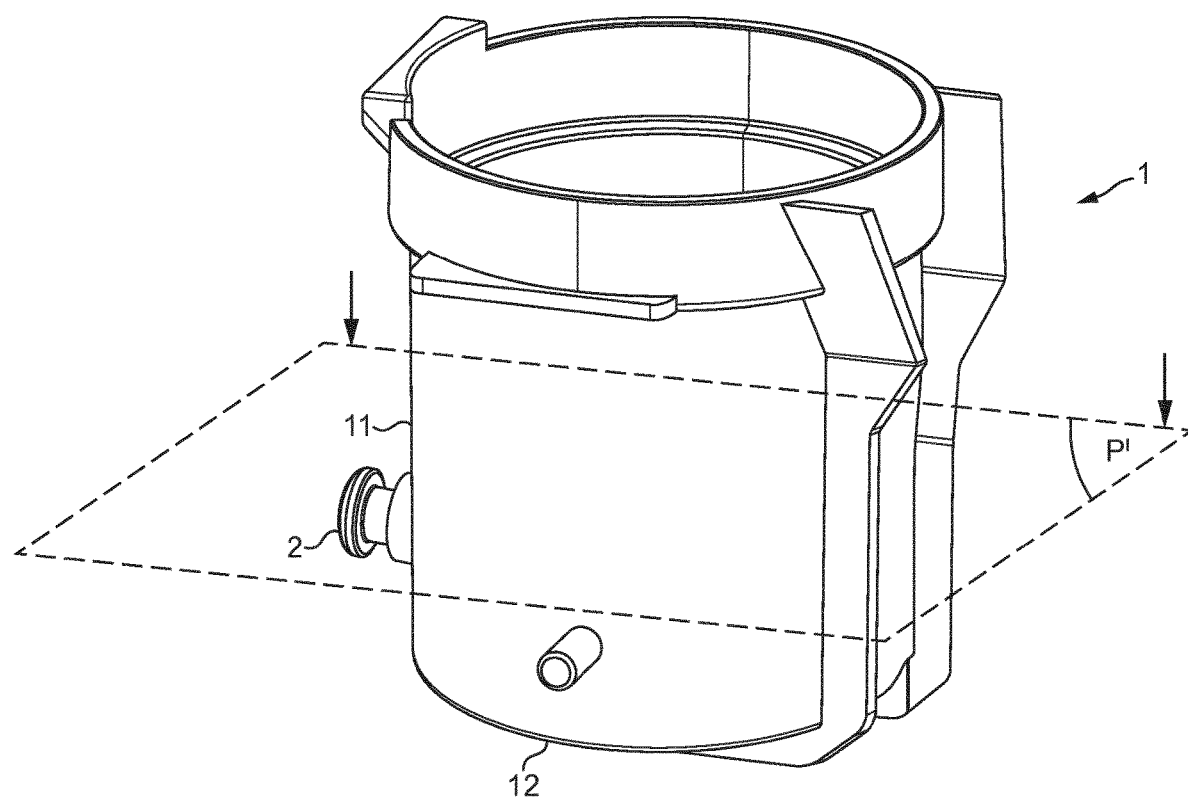

FIGS. 2a and 2b are perspective views of a chamber 1 according to the invention used in a beverage preparation apparatus such as described in FIG. 1, but not limited to.

The chamber 1 comprises a cylindrical lateral side wall 11 and a bottom wall 12. These walls define an internal volume able to contain a liquid.

Preferably the cylindrical lateral side wall is such that its longitudinal distance (height) is longer than its cross section dimension (diameter). The volume is generally set so as to hold the volume of a beverage cup. Usually the diameter is comprised between 40 and 50 mm and the height is comprised between 40 and 75 mm. This size enables the preparation of a single cup of beverage such as an espresso coffee.

The cylindrical lateral side wall 11 comprises a liquid inlet 2. This liquid inlet 2 is positioned close to the bottom of the chamber. Generally, the distance between the bottom of the chamber and the central axis of the liquid inlet is comprised between 1 and 12 mm, preferably of about 5 mm.

Figure 2C:
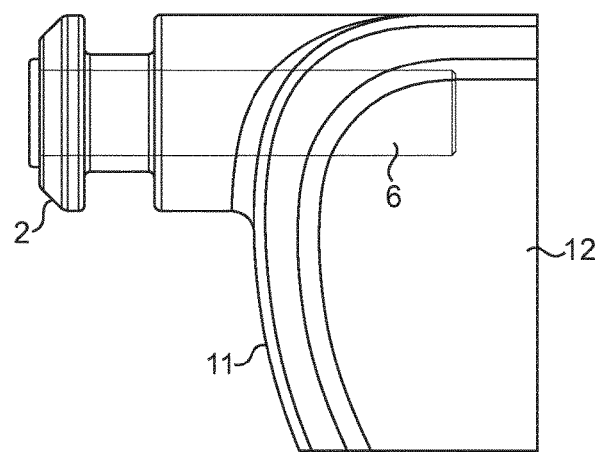
FIG. 2c is a magnified view of the area of the liquid inlet of the chamber of FIGS. 2a, 2b, the chamber being made transparent.

This liquid inlet 2 is configured so that the liquid is introduced in the chamber as a straight jet of liquid. Preferably, this straight jet is produced by and emerges from a nozzle 6 positioned in the liquid inlet of the chamber as illustrated in FIG. 2c.

Figure 3:
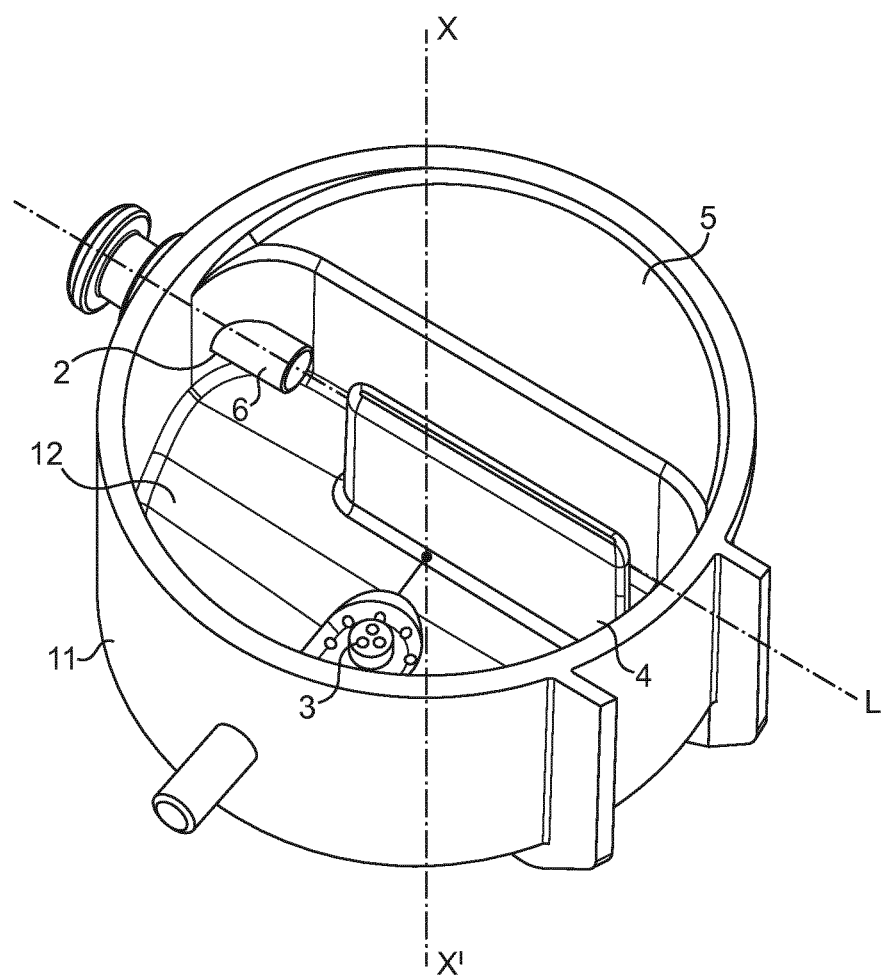
FIG. 3 is a perspective view of the lower part of the chamber of FIG. 2b under the plan P' illustrated in FIG. 2b.
Figure 4:
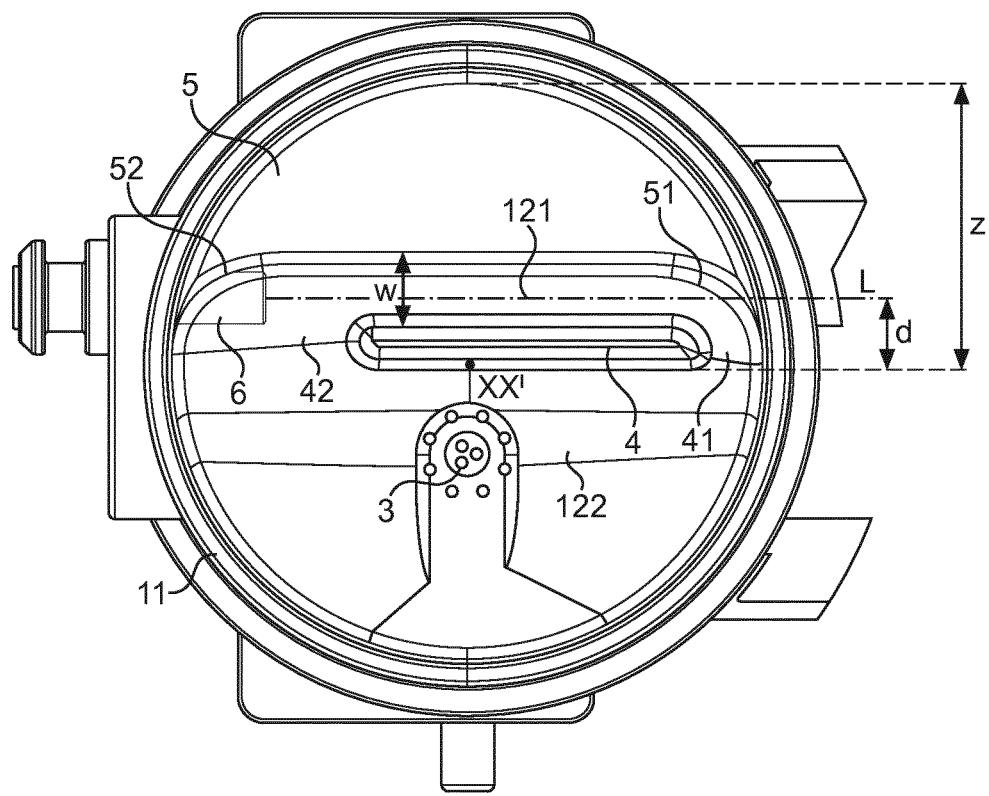
FIG. 4 is a top view of the chamber of FIG. 2b.

The liquid inlet is also configured so that the straight jet of liquid extends horizontally and transversely through the internal volume of the chamber along a line L, said line L being offset relative to the longitudinal central axis XX' of the chamber, as illustrated in the top view of the chamber in FIGS. 3 and 4.

More specifically, the line L is oriented in a direction so that a ratio "d/r" is comprised between 0.2 and 0.4, preferably of about 0.3, where "r" is the radius of the chamber and "d" is the distance measured orthogonally from the line L to the central longitudinal axis XX' of the chamber.

As illustrated, a nozzle 6 is positioned in the liquid inlet 2, this nozzle being designed for producing a straight jet of liquid. According to another embodiment, the nozzle can be moulded in the liquid inlet that is in the chamber lateral side wall.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm. With such a dimension, the delivery of water at a pressure comprised between 2 and 10 bar, preferably of at least 6 bar, in the nozzle enables the production of a jet of high velocity.

As illustrated, preferably, the outlet end 61 of the nozzle juts out over the internal surface of the lateral side wall. The outlet end can jut out by about 3 to 5 mm. It has been noticed that beverages with improved crema were produced.

FIG. 3 is a perspective view of the lower part of the chamber of FIG. 2b positioned under the plan P' in FIG. 2b and shows the features of the lower part of the chamber.

The bottom wall 12 comprises the beverage outlet 3 of the chamber. In the illustrated embodiment this beverage outlet comprises a plurality of holes positioned at different levels of the bottom wall. Other designs of beverage outlet can be implemented.

The chamber comprises a first internal bump 4 rising from the surface of the bottom wall 12 of the chamber. As illustrated in the top view of the chamber in FIG. 4, this first bump extends form the surface of the bottom. In addition, it is designed in order to separate two areas 121, 122 of the bottom part of the chamber. The first bump 4 separates:
 a first area 121 wherein the introduced straight jet of liquid extends along the line L, from
 a second area 122 comprising the beverage outlet 3.

As a consequence, this first bump 4 prevents liquid emerging from the liquid inlet 2 from immediately reaching the beverage outlet 3. The first bump 4 guides the introduced jet of liquid away from the beverage outlet 3.

Generally and as illustrated, the side of the first internal bump facing the first area 121 is a straight surface. This straight surface extends in parallel to the line L along which the straight jet of liquid extends and helps for guiding this jet. The jet is canalised. It is not chaotic or disorganised. There is no splash creating lot of mist and drops through the chamber. The jet is more easily converted in a swirl as explained hereunder.

According to the embodiment illustrated in FIGS. 3 and 4, the other side of the first internal bump facing the second area 122 is a straight surface parallel to the line L too. According to this embodiment, the first bump is a straight wall rising form the bottom and parallel to the line L. This wall is not thick and defines a large volume in the second area 122.

According to another embodiment, the other side of the first internal bump 4 facing the second area 122 partially surrounds the beverage outlet 3. According to this embodiment illustrated in FIG. 10, the first bump can present a half-moon shape rising from the bottom and said half-moon shape comprising a notch around the beverage outlet.

Figure 10:
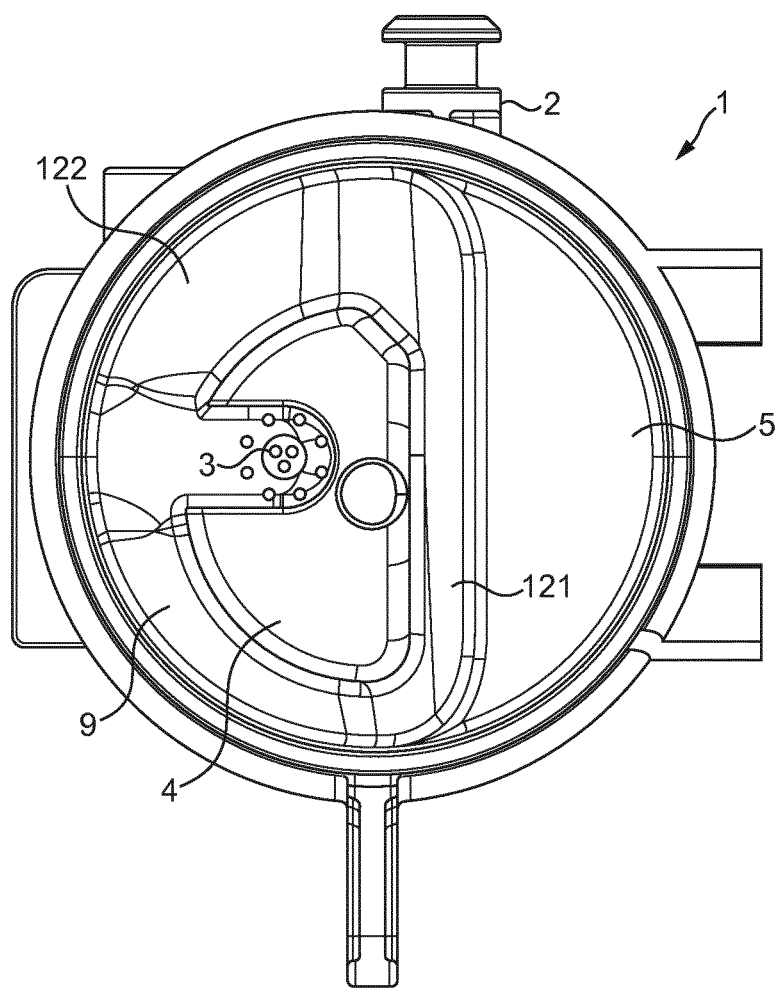
FIG. 10 is a top view of another chamber according to the invention.

As illustrated in FIG. 10, this half-moon shape is designed and positioned so as to create a conduit 9. Preferably, the cross section area of this conduit 9 increases in direction of the liquid inlet 2. This shape prevents the swirl of liquid from reaching the beverage outlet and enables the control of the speed of said swirl, said speed decreasing with the increase of the cross section area of the conduit.

The notch enables the evacuation of the beverage once no more liquid is introduced in the chamber and the speed of the swirl decreases until it disappears.

The chamber 1 comprises a second bump 5 rising from the surface of the bottom and extending from the surface of the lateral side walls 11, 12 of the chamber and presenting a shape designed to convert the introduced straight jet of liquid into a swirl upwardly rising along the lateral side wall of the chamber.

In the illustrated embodiment, the second bump 5 presents:
 a first essentially horizontal wall that internally rises from the bottom of the chamber, and
 a second essentially vertical wall that internally extends from the lateral wall of the chamber to near to the liquid inlet 2 and to the line L.

The second bump presents a globally half-moon shape rising from the bottom of the chamber.

In order to convert the introduced straight jet of liquid into a swirl upwardly rising along the lateral side wall of the chamber, the second bump 5 presents a curved shape 51 guiding the end of the straight jet of liquid along the lateral cylindrical wall 11 of chamber. Accordingly the entering flow of liquid follows the lateral wall and swirls.

Moreover, the second bump 5 presents a shape designed to guide the swirl so that, when the flow reaches the area of the liquid inlet, the swirl flows again along the line L in front of the liquid inlet.

In the illustrated embodiment, the second bump 5 presents a curved shape 52 forcing the liquid to leave the cylindrical path defined by the cylindrical wall of the chamber and turn in front of the liquid inlet and to flow along the line L.

Due to the small thickness of the wall the first bump 4 is made of, liquid emerging from the path 41 opposite to the liquid inlet swirls in a large section area in the second zone 122 and the speed of the liquid decreases.

Consequently, once liquid is introduced in the liquid inlet, a straight jet of water is produced along the line L. This straight jet of water is converted in a swirl of liquid at the curved shape 51. This swirl flows along the cylindrical wall of the chamber in the second area 12 of the chamber. Then the swirl follows the curved shape 52 of the second bump along an increased curvature compared to the curvature of the cylindrical wall of the lateral wall and is guided again along the line L. Once this curtain of swirling liquid reaches the area near to the liquid inlet and passes the path 42 close to the liquid inlet, the speed of the swirl is highly decreased compared to the speed of the liquid initially introduced. Due to the difference between the speed of the straight jet of liquid that goes on entering and the speed of the swirl of liquid at the liquid inlet, an important shearing of the swirl by the jet happens inducing the production of froth with very fine bubbles that is a crema in coffee.

In addition to that, the first bump 4 prevents liquid entering the chamber from directly reaching the beverage outlet. The effect is that almost the whole volume of liquid introduced in the chamber is submitted to the above high shearing.

Preferably, the first internal bump 4 and the second internal bump 5 partially design a straight conduit around the straight jet.

Accordingly the first and second bumps present shapes and are oriented one to the other in order to create a straight conduit. Preferably, each of the first and second bumps can present a straight surface parallel to the line L.

Preferably the bumps are positioned so as to design a straight conduit presenting a width w comprised between 3 and 10 mm, preferably between about 5 and 6 mm.

Preferably the first and the second bumps extend upwardly along the same height and partially only along the height if the chamber. The height of the first and the second bumps can be comprised between 5 and 20 mm.

Preferably the surface of the top of the second bump 5 is inclined in respect of horizontal and in direction of the beverage outlet 3. Accordingly no liquid is retained at the surface of this bump at the end of the beverage preparation and the chamber can be fully emptied.

Figure 5:
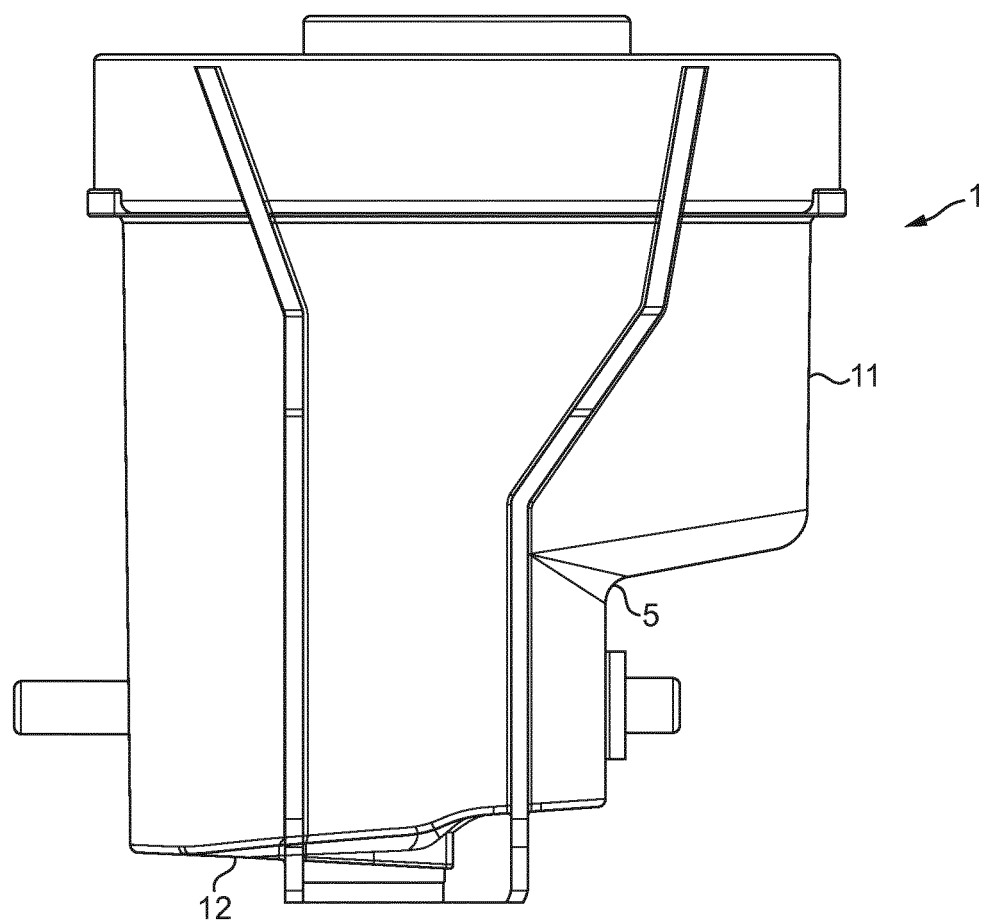
FIG. 5 is a side view of the chamber of FIG. 2a according to direction A.

FIG. 5 is a side view of the chamber of FIG. 2a. This view makes apparent the second bump 5 rising from the bottom 12 and extending from the lateral side wall 11.

Figure 6:
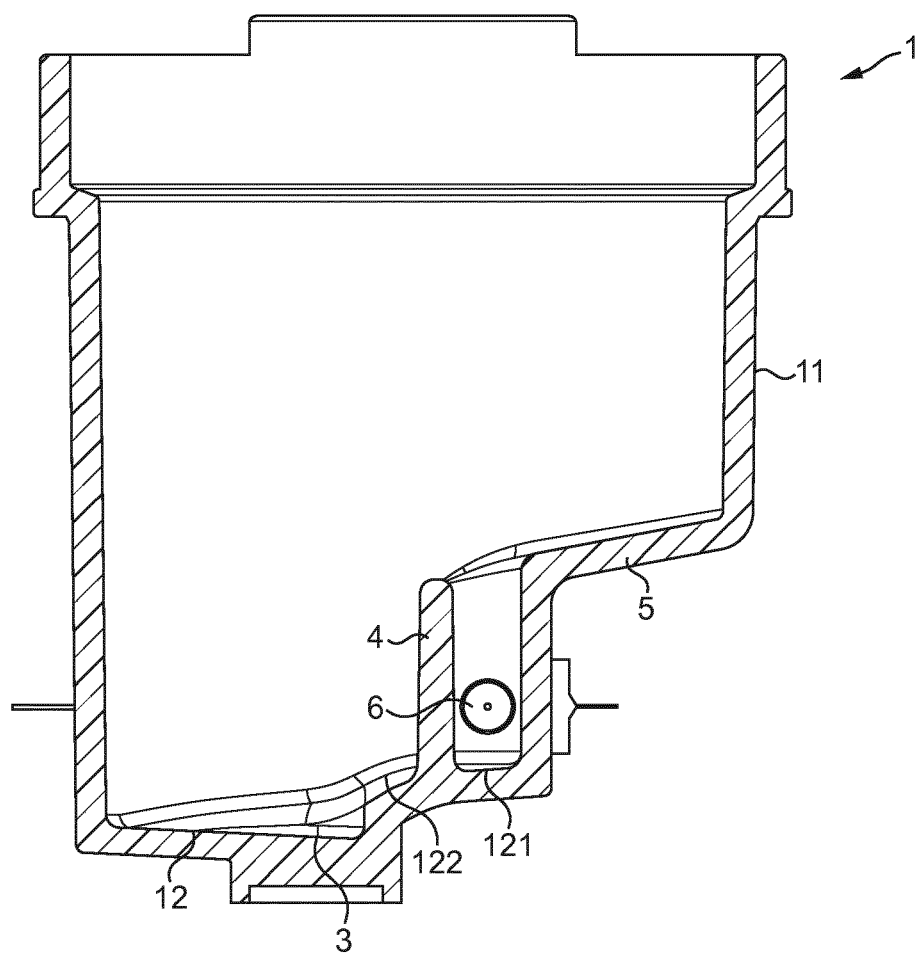
FIG. 6 is a cross-sectional view of the chamber of FIG. 2 as taken along plane P of FIG. 2.

FIG. 6 is a cross-sectional view of the chamber of FIG. 2a. This figure shows the first bump 4 rising as a straight wall and separating the area 121, in which the jet dispensed by the nozzle 6 expands, from the area 122 comprising the beverage outlet 3.

This section view shows how the bottom wall 12 and the top surface of the second bump 5 are inclined.

Figure 7:
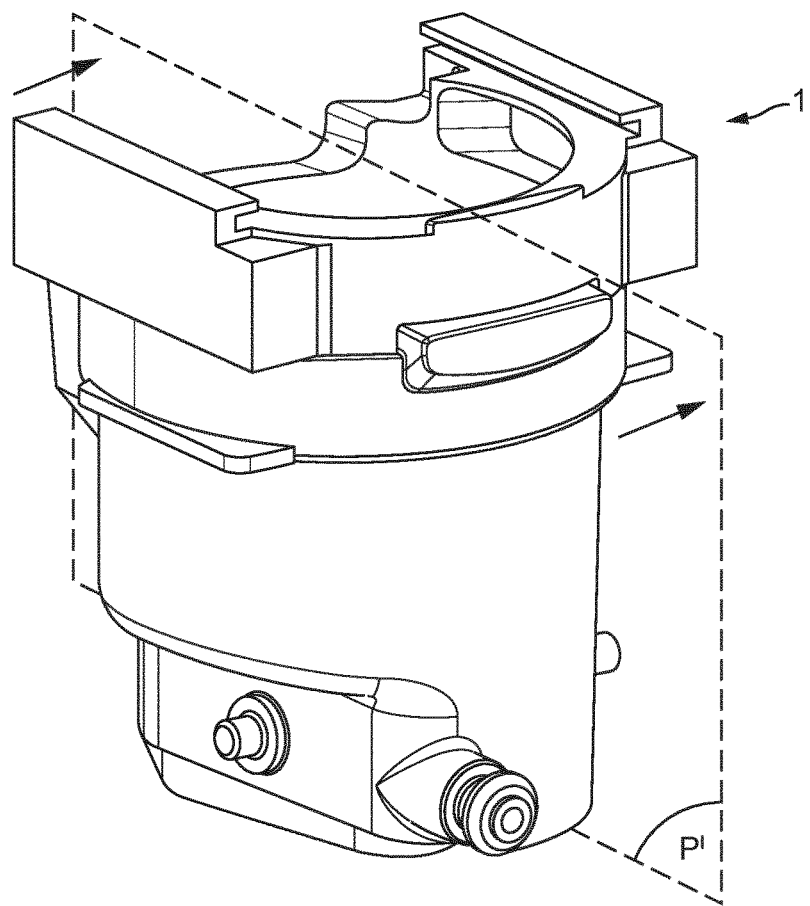
FIG. 7 is a perspective view of the chamber of FIG. 2 with a funnel at the top.
Figure 8:
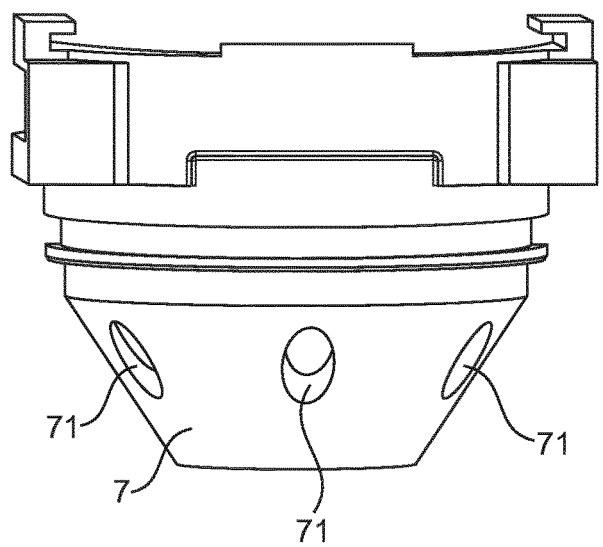
FIG. 8 is a perspective view of the funnel alone.
Figure 9A:
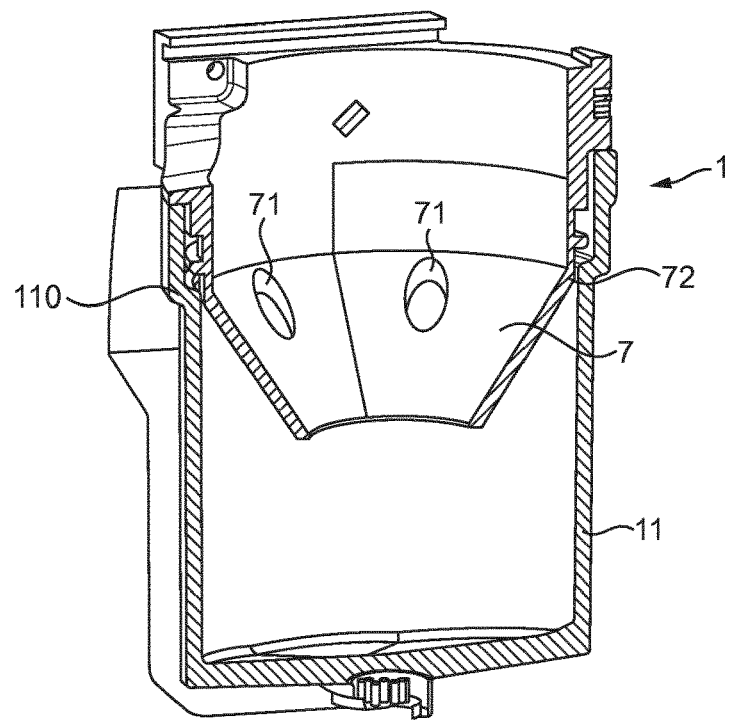
FIG. 9a is a cross-sectional view of the chamber of FIG. 7 as taken along plane P' of FIG. 7.

FIG. 7 is a perspective view of the chamber of FIG. 2 with a funnel at the top and FIG. 9a is a cross sectional view along plane P'. The funnel 7 alone is represented in FIG. 8. This funnel narrows from the top to the bottom and acts as a chute for a dose of beverage ingredient introduced through the top of the chamber. The top edge 72 of the funnel cooperates with the top edge 110 of the lateral wall of the chamber. Consequently, during the preparation of a beverage, the swirl of liquid rising along the lateral wall 11 is trapped between the top edge 110 of the lateral wall and the top edge 72 of the funnel and does not overflow.

Several holes 71 are provided through the funnel. Accordingly, during the preparation of a beverage, the swirl of liquid passes through these holes and go on swirling in the funnel 7; any beverage ingredient that would have settled in the funnel during the dosing step is dissolved and removed by the swirl. An efficient rinsing of the funnel is achieved.

Figure 9B:
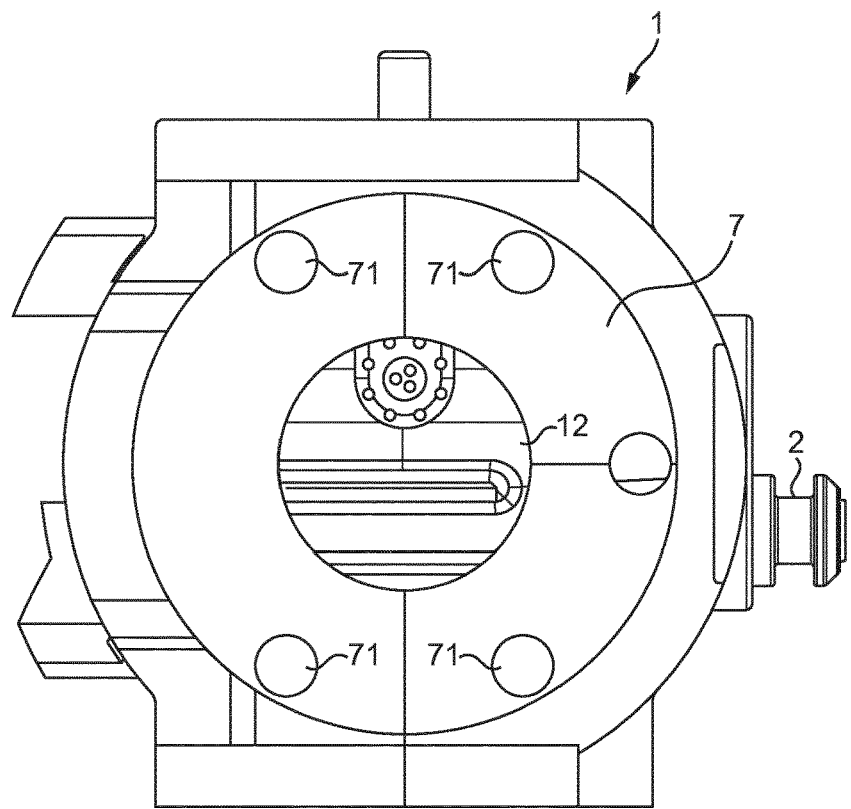
FIG. 9b is a top view of the chamber of FIG. 7.

FIG. 9b is a top view of the chamber of FIG. 7: it can be observed that no hole 71 is present in the funnel 7 above the area that is opposed to the liquid inlet 2. Accordingly, there is no risk that any mist eventually created by the jet of water in this area passes through a hole of the funnel.

Figure 12:
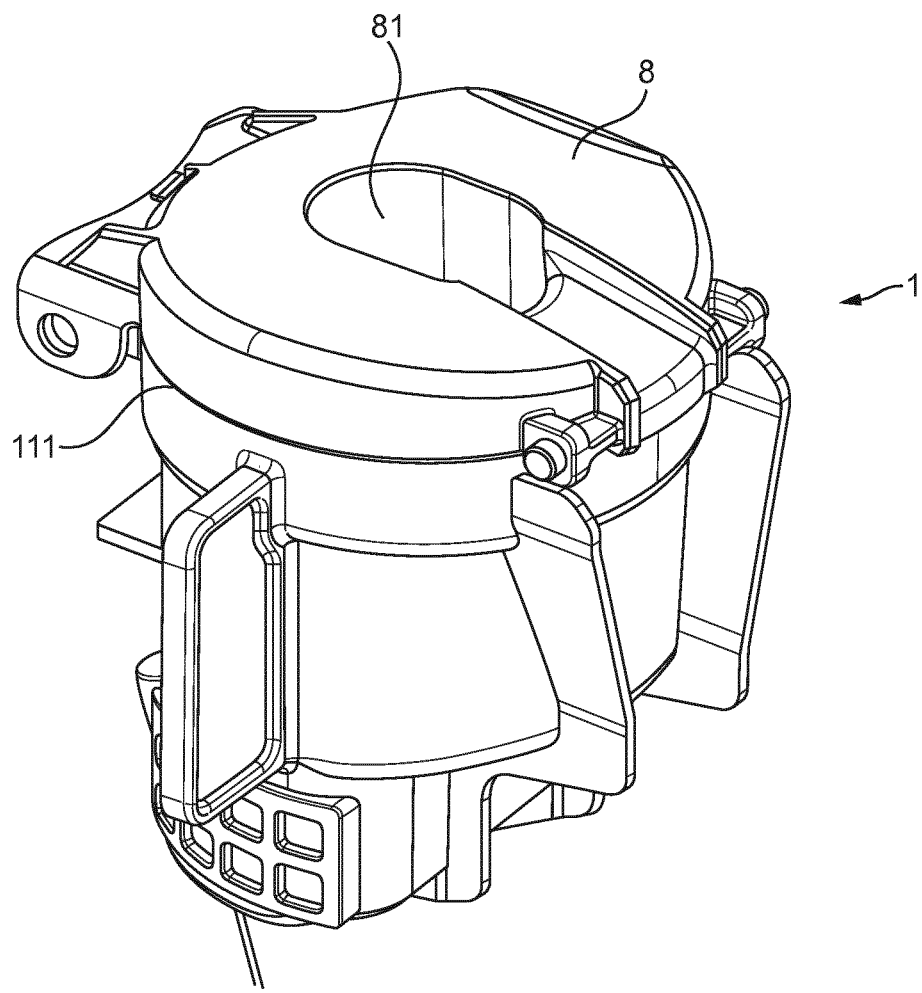
FIG. 12 is a perspective view of a chamber with a cover at the top.
Figure 13:
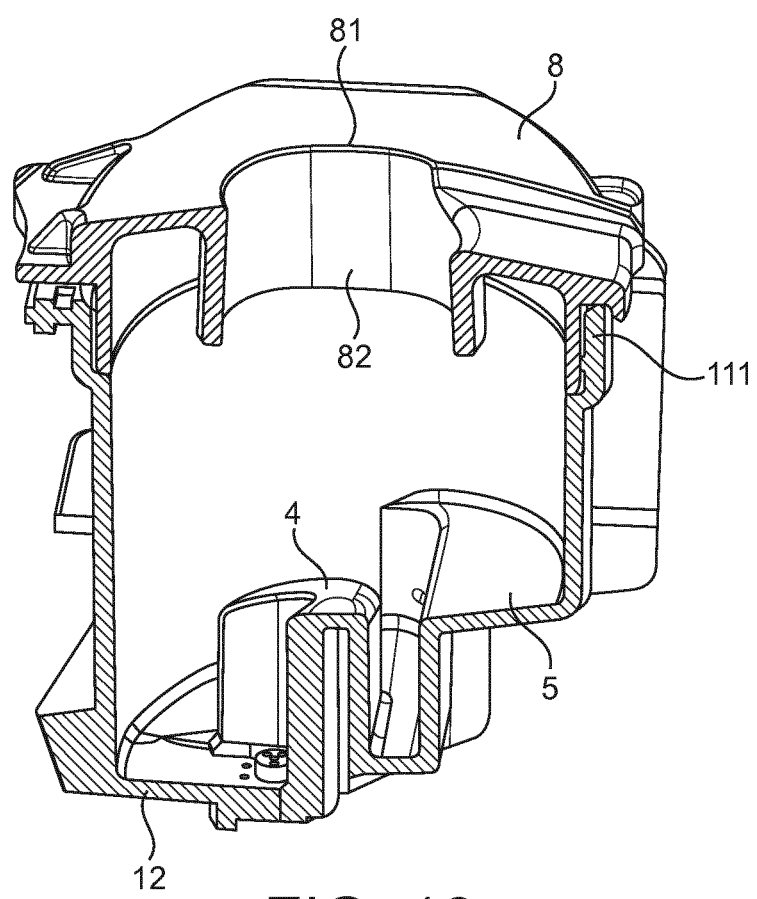
FIG. 13 is a cross-sectional view of the chamber of FIG. 13 as taken along a central vertical plane P.

FIG. 12 is a perspective view of a chamber with a cover 8 at the top. The cover comprises one hole 81 enabling the introduction of beverage ingredient. FIG. 13 is a cross-sectional view of the chamber of FIG. 12 as taken along a central vertical plane. The cover comprises a lip 82 extending downward from the hole 81. The lip maintains the swirl of liquid inside the chamber.

Figure 11:
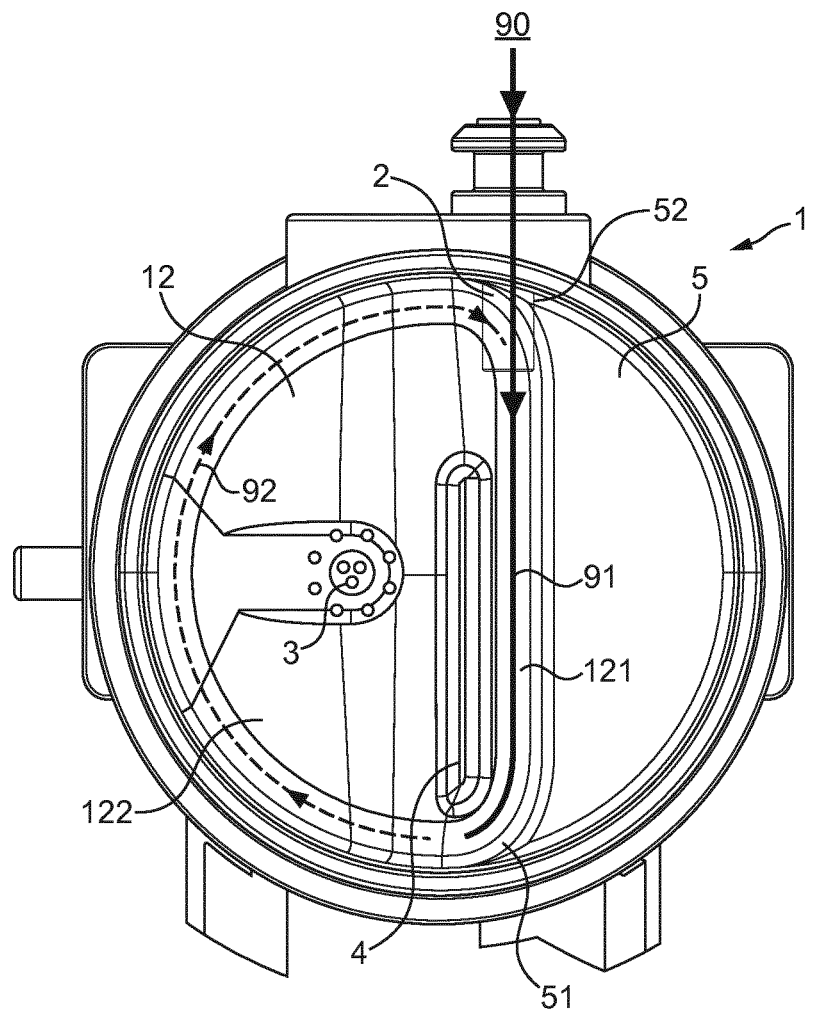
FIG. 11 illustrates the flow of liquid in the chamber of FIG. 4.

FIG. 11 illustrates the circulation of liquid in the chamber of FIG. 4. Liquid 90 enters through the inlet 2 as a straight jet 91. The jet is canalized in the conduit defined by the walls of the bumps 4, 5 parallel to line L and prevented from reaching the beverage outlet 3. The first bump 4 isolates the first area 121 in which the jet of liquid flows with the highest velocity from the rest of the chamber. Without this first bump, the flow inside the chamber would be chaotic and disorganized and would rapidly reach the beverage outlet.

The curved shape 51 of the second bump forces the straight jet to follow the cylindrical lateral wall of the chamber at the side opposite to the liquid inlet and converts the flow of liquid in a swirl 92 along said cylindrical lateral wall. The centrifugal force keeps the flow on the lateral side wall, while the beverage outlet is globally in the middle of the chamber. Simultaneously, due to the large cross section area in this area 122 for liquid flowing from the first area 121 to the second area 122, the velocity of the flow is decreased in this second area 122.

In front of the liquid inlet 2, the curved shape 52 of the second bump forces the swirl 92 to rotate in front of the liquid inlet and of the jet of liquid entering the chamber. The difference of speeds between the jet 91 and the swirl 92 induces a high shearing of the swirl by the jet: the interface between air and the surface of liquid is broken in multiple fine drops creating crema when a coffee is prepared.

Accordingly during the first period of beverage preparation process, no liquid flows through the beverage outlet and there is an efficient mixing of the beverage ingredient, liquid and air. There is no risk that insufficiently dissolved ingredient or water alone flows through the outlet. Beverage ingredient and liquid are well mixed together.

With further introduction of liquid, the swirl rises up to the top of the chamber and gets thicker at its bottom. Then, beverage can reach the beverage outlet but the mixing time has been sufficient to get an efficient mixing and dissolution.

The bumps of the chamber force the flow along a certain pattern, which purposes are to:

generate high shear through the liquid in order to make crema force the liquid to rotate in the chamber without reaching the bottom outlet during a certain time. This effect presents the advantage of avoiding an actively controlled closable outlet. This delaying time is useful to maximize the quantity of crema, its quality, and also maximize the dissolution of ingredient.

The beverage preparation apparatus of the present invention presents the advantage of providing a chamber in which a thorough mixing of soluble ingredient and liquid can be implemented without that water, mist or humidity squirts out of the chamber. Accordingly, the movement of the chamber away from the dosing device during the beverage preparation is not required any longer.

Another advantage of the chamber is that the beverage is retained in the chamber as long as liquid is introduced inside. Consequently, the risk that unmixed product is dispensed is prevented. Besides, it enables big bubbles created during the mixing to disappear from the beverage. An explanation is that, during at the beginning of the beverage preparation, liquid does not reach the beverage outlet because of the centrifugal effect and the presence of the first bump acting like a deflector. Then, as the swirl of liquid rises in the chamber and more and more liquid is introduced, a part of the swirl reaches the outlet. The flow in the centre of the swirl presents low velocity, with little oscillations. Therefore, liquid flows gently to the outlet without big oscillations producing an alternation of liquid and air in the outlet, which would create bubbles. In that way, bubbles are avoided.

Another advantage of the chamber is that the mixing is so efficient that soluble beverage ingredient can be dissolved even with ambient or cold water and without final residues.

Another advantage of the chamber is that the design of the chamber enables an efficient rinsing of its internal surface at the end of the beverage preparation.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS chamber 1
lateral side wall 11
top edge 110
bottom wall 12
first area 121
second area 122
liquid inlet 2
beverage outlet 3
first bump 4
paths 41, 42
second bump 5
first curved shape 51
second curved shape 52
nozzle 6
funnel 7
holes 71
top edge 72
cover 8
hole 81
lip 82
conduit 9
beverage preparation apparatus 100
tank 101
pump 102
heater 103
valve 104
water supplying system 105
pipe 106
container 107
dosing device 108
service tray 109
controller 111
command 112
drinking cup 113
liquid 90
straight jet of liquid 91
swirl of liquid 92

The invention claimed is:

1. Beverage preparation apparatus, the apparatus comprising at least one chamber for receiving and mixing an aqueous liquid and at least one soluble beverage ingredient, the chamber comprising:
a cylindrical lateral side wall comprising a liquid inlet;
a bottom wall comprising a beverage outlet;
wherein the liquid inlet is positioned close to the bottom of the chamber, and
wherein the liquid inlet is configured so that the liquid is introduced in the chamber as a straight jet of liquid, said introduced straight jet extending horizontally and transversely through the internal volume of the chamber along a line, the line being offset relative to the longitudinal central axis of the chamber,
the chamber comprises a first internal bump rising from the bottom wall of the chamber, the first bump separating:
a first area of the bottom wall wherein the introduced straight jet extends horizontally and transversely through the internal volume of the chamber along a line,
from a second area of the bottom wall comprising the beverage outlet,
and
the chamber comprises a second bump rising from the bottom and extending from the lateral side wall of the chamber and presenting a shape designed:
to convert the introduced straight jet of liquid extending horizontally and transversely through the internal volume of the chamber into a swirl upwardly rising along the lateral side wall of the chamber, and
to guide the swirl so that it flows along the line in front of the liquid inlet.

2. Beverage preparation apparatus according to claim 1, wherein the liquid inlet comprises a nozzle.

3. Beverage preparation apparatus according to claim 1, wherein the first internal bump extends partially through the section of the chamber and, at its lateral ends, provides paths for the swirl of liquid.

4. Beverage preparation apparatus according to claim 1, wherein the side of the first internal bump facing the first area is a straight surface.

5. Beverage preparation apparatus according to claim 4, wherein the first bump is a straight wall rising from the bottom and parallel to the line.

6. Beverage preparation apparatus according to claim 1, wherein, at the point of the chamber opposed to the liquid inlet along the line, the second bump designs a curve configured to convert the straight jet of liquid into a swirl along the cylindrical lateral side wall of the chamber.

7. Beverage preparation apparatus according to claim 1, wherein, at the liquid inlet, the second bump designs a curve configured to guide the swirl of liquid in direction of and along the line in front of the liquid inlet.

8. Beverage preparation apparatus according to claim 1, wherein the first internal bump and the second internal bump partially designs a straight conduit around the straight jet of liquid.

9. Beverage preparation apparatus according to claim 1, wherein the first bump is designed to decrease the speed of the swirl of liquid in the area of the liquid inlet.

10. Beverage preparation apparatus according to claim 1, wherein the first bump is designed so as to define a cross section area above the second area of the bottom for the swirl of liquid larger than the cross section area above the first area of the bottom for the jet of liquid.

11. Beverage preparation apparatus according to claim 1, wherein the first and the second bumps extend upwardly along the same height.

12. Beverage preparation apparatus according to claim 1, wherein the surface of the bottom of the chamber is inclined in respect of horizontal and the beverage outlet is positioned at the lowest position.

13. Beverage preparation apparatus according to claim 1, wherein chamber comprises a top cover at the upper end of the cylindrical lateral side wall of the chamber and said top cover comprises a hole defining an inlet for soluble beverage ingredient.

14. Beverage preparation apparatus according to claim 1, wherein the chamber comprises a funnel attached at the upper end of the cylindrical lateral side wall of the chamber, said funnel extending from the top of the chamber down to the inside of the chamber and said funnel comprising discrete holes.

15. Beverage preparation apparatus according to claim 1 comprising a liquid supply system connectable to the liquid inlet.

16. Beverage preparation apparatus according to claim 15 comprising a dosing device configured for dispensing a dose of soluble beverage ingredient in the chamber.

17. Method for producing a beverage in a beverage preparation apparatus comprising at least one chamber for receiving and mixing an aqueous liquid and at least one soluble beverage ingredient, the chamber comprising a cylindrical lateral side wall comprising a liquid inlet, a bottom wall comprising a beverage outlet, wherein the liquid inlet is positioned close to the bottom of the chamber, and wherein the liquid inlet is configured so that the liquid is introduced in the chamber as a straight jet of liquid, said introduced straight jet extending horizontally and transversely through the internal volume of the chamber along a line, the line being offset relative to the longitudinal central axis of the chamber, the chamber comprises a first internal bump rising from the bottom wall of the chamber, the first bump separating a first area of the bottom wall wherein the introduced straight jet extends horizontally and transversely through the internal volume of the chamber along a line, from a second area of the bottom wall comprising the beverage outlet, and the chamber comprises a second bump rising from the bottom and extending from the lateral side wall of the chamber and presenting a shape designed to convert the introduced straight jet of liquid extending horizontally and transversely through the internal volume of the chamber into a swirl upwardly rising along the lateral side wall of the chamber, and to guide the swirl so that it flows along the line in front of the liquid inlet comprising the steps of:

dosing the chamber with soluble beverage ingredient; and
introducing a liquid through the liquid inlet.

* * * * *